(12) United States Patent
Van Oost et al.

(10) Patent No.: US 11,316,759 B2
(45) Date of Patent: Apr. 26, 2022

(54) METHOD FOR PREDICTING A LEVEL OF QOE OF AN APPLICATION INTENDED TO BE RUN ON A WIRELESS USER EQUIPMENT

(71) Applicant: AirTies Belgium SPRL, Woluwe-Saint-Lambert (BE)

(72) Inventors: Koen Van Oost, Borsbeek (BE); Diego Neves da Hora, Cachan (FR); Renata Teixeira, Paris (FR); Karel Van Doorselaer, Edegem (BE)

(73) Assignee: AIRTIES BELGIUM SPRL, Woluwe-Saint-Lambert (BE)

( * ) Notice: Subject to any disclaimer, the term of this patent is extended or adjusted under 35 U.S.C. 154(b) by 62 days.

(21) Appl. No.: 16/542,546

(22) Filed: Aug. 16, 2019

(65) Prior Publication Data
US 2020/0007419 A1    Jan. 2, 2020

Related U.S. Application Data

(63) Continuation of application No. 15/475,011, filed on Mar. 30, 2017, now abandoned.

(30) Foreign Application Priority Data

Apr. 1, 2016  (EP) ..................................... 16305390

(51) Int. Cl.
*H04L 12/24* (2006.01)
*H04W 72/04* (2009.01)
(Continued)

(52) U.S. Cl.
CPC ........ *H04L 41/5067* (2013.01); *H04L 41/147* (2013.01); *H04L 41/5009* (2013.01);
(Continued)

(58) Field of Classification Search
CPC ............... H04L 41/5067; H04L 41/147; H04L 41/5009; H04L 43/08; H04L 43/0894;
(Continued)

(56) References Cited

U.S. PATENT DOCUMENTS 8,892,731 B2 * 11/2014 Oki ...................... G06F 11/3409
709/224
9,131,449 B2 * 9/2015 Puranik ................. H04W 52/04
(Continued)

FOREIGN PATENT DOCUMENTS

CN       101835058 A     9/2010
CN       104507128 A     4/2015
(Continued)

OTHER PUBLICATIONS

Qiao, "Smarter Phone Based Live QoE Measurement", 15th International Conference on intelligence in Next Generation Networks (ICIN), Berlin, Germany, Oct. 4, 2011, pp. 64-68 (Year: 2011).*
(Continued)

*Primary Examiner* — Edan Orgad
*Assistant Examiner* — Vanneilian Lalchinthang
(74) *Attorney, Agent, or Firm* — Volpe Koenig

(57) ABSTRACT

The present disclosure is directed toward a device and a method for evaluating a wireless link established between an access point and a user equipment. The device and method include determining a level of Quality of Experience of an application intended to be run on the user equipment using a mapping between a parameter representative of the QoE of the application under different wireless transmission conditions and sets of parameters representative of said different transmission conditions of the wireless link.

20 Claims, 3 Drawing Sheets

(51) Int. Cl.
| | |
|---|---|
| *H04L 12/807* | (2013.01) |
| *H04L 41/5067* | (2022.01) |
| *H04L 41/5009* | (2022.01) |
| *H04L 41/147* | (2022.01) |
| *H04W 24/02* | (2009.01) |
| *H04W 24/10* | (2009.01) |
| *H04W 84/12* | (2009.01) |
| *H04W 88/02* | (2009.01) |
| *H04W 88/08* | (2009.01) |

(52) U.S. Cl.
CPC .......... *H04W 24/02* (2013.01); *H04W 24/10* (2013.01); *H04W 84/12* (2013.01); *H04W 88/02* (2013.01); *H04W 88/08* (2013.01)

(58) Field of Classification Search
CPC ..... H04L 41/142; H04B 17/30; H04B 17/309; H04B 17/318; H04W 24/02; H04W 24/10; H04W 84/12; H04W 88/02; H04W 88/08
USPC ........................................................ 370/252
See application file for complete search history.

(56) References Cited

U.S. PATENT DOCUMENTS

| | | | | |
|---|---|---|---|---|
| 2007/0180106 A1* | 8/2007 | Pirzada | ............ | H04N 21/64738 709/224 |
| 2011/0090922 A1* | 4/2011 | Wang | ................. | H04L 65/4092 370/465 |
| 2011/0149775 A1* | 6/2011 | Lee | ...................... | H04L 41/147 370/252 |
| 2011/0222669 A1* | 9/2011 | Buriano | ................. | H04L 65/80 379/32.01 |
| 2011/0286344 A1* | 11/2011 | Hanaoka | ............... | H04W 36/26 370/252 |
| 2013/0290525 A1* | 10/2013 | Fedor | .................... | H04L 41/147 709/224 |
| 2014/0033242 A1* | 1/2014 | Rao | ......................... | H04L 65/80 725/14 |
| 2014/0105058 A1* | 4/2014 | Hu | ......................... | H04W 24/08 370/253 |
| 2016/0278088 A1* | 9/2016 | Cheng | .................. | H04W 28/18 |
| 2016/0278107 A1* | 9/2016 | Bar Bracha | ............. | H04L 67/36 |

FOREIGN PATENT DOCUMENTS

| | | | | |
|---|---|---|---|---|
| FR | 2992809 | | 1/2014 | |
| FR | 2992809 A1 * | | 1/2014 | ......... H04L 65/4084 |
| WO | 13114819 A1 | | 8/2013 | |
| WO | 2015/044343 | | 4/2015 | |
| WO | 2015/144211 | | 10/2015 | |
| WO | WO-2015144211 A1 * | | 10/2015 | ......... H04L 41/5009 |

OTHER PUBLICATIONS

Anonymous, "Estimating end to end performance in IP networks for data applications," ITU-T Telecommunication Standardization Sector of ITU. Series G: Transmission Systems and Media, Digital Systems and Networks, Quality of Service and performance—Generic and user-related aspects, Recommendation G.1030, Nov. 2005, pp. 1-28.

Basak et al., "Support Vector Regression," Neural information Processing—Letters and Reviews, vol. 11, No. 10, Oct. 2007, pp. 203-224.

Cheng et al., "Jigsaw: Solving the Puzzle of Enterprise 802.11 Analysis," 2006 Conference on Applications, Technologies, Architectures, and Protocols for Computer Communications, SIGCOMM'06, Pisa, Italy, Sep. 11, 2006, pp. 39-50.

Da Hora et al., "Passive Wi-Fi Link Capacity Estimation on Commodity Access Points," Traffic Monitoring and Analysis Workshop (TMA) 2016, Louvain-la-Neuve, Belgium, Apr. 7, 2016, pp. 1-10.

Egger et al., "Waiting Times in Quality of Experience for Web Based Services," 2012 Fourth International Workshop on Quality of Multimedia Experience (QoMEX), Melbourne, Australia, Jul. 5, 2012, pp. 86-96.

Hossfeld et al., "Quantification of YouTube QoE via Crowdsourcing," 2011 IEEE International Symposium on Multimedia (ISM), Dana Point, California, USA, Dec. 5, 2011, pp. 494-499.

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

Kanuparthy et al., "Can User-Level Probing Detect and Diagnose Common Home—WLAN Pathologies?" ACM SIGCOMM Computer Communication Review, vol. 42, No. 1, Jan. 2012, pp. 8-15.

Lakshminarayanan et al., "Understanding 802.11 Performance in Heterogeneous Environments," ACM, SIGCOMM Workshop on Home Networks, Ontario, Canada, Aug. 15, 2011, pp. 43-48.

Oyman et al., "Quality of Experience for HTTP Adaptive Streaming Services", IEEE Communications Magazine, vol. 50, No. 4, Apr. 2012, pp. 20-27.

Patro et al., "Observing Home Wireless Experience through WiFi Aps," 19th Annual International Conference on Mobile Computing & Networking, Miami, Florida, USA, Sep. 30, 2013, pp. 1-12.

Pei et al., "WiFi Can Be the Weakest Link of Round Trip Network Latency in the Wild," 35th Annual IEEE International Conference on Computer Communications, IEEE Infocom 2016, San Francisco, California, USA.

Qiao, "Smarter Phone Based Live QoE Measurement," 15th International Conference on Intelligence in Next Generation Networks (ICIN), Berlin, Germany, Oct. 4, 2011, pp. 64-68.

Rayanchu et al., "Airshark: Detecting Non-WiFi RF Devices using Commodity WiFi Hardware," 2011 ACM Internet Measurement Conference IMC'11, Berlin, Germany, Nov. 2, 2011, pp. 1-14.

Spetebroot et al., "From network-level measurements to expected Quality of Experience: tile Skype use case," 2015 IEEE International Workshop on Measurements & Networking (M&N), Coimbra, Portugal, Oct. 12, 2015, pp. 1-6.

Sundaresan et al., "Measuring the Performance of User Traffic in Home Wireless Networks," 16th International Conference on Passive and Active Measurement. New York, New York, USA, Mar. 19, 2015, pp. 305-317.

Syrigos et al., "Enabling Wireless LAN Troubleshooting," 16th International Conference on Passive and Active Measurement, New York, New York, USA, Mar. 19, 2015, pp. 318-331.

Tsamardinos et al., "Performance-Estimation Properties of Cross-Validation-Based Protocols with Simultaneous Hyper-Parameter Optimization", 8th Hellenic Conference on Artificial intelligence, SETN 2014, Ioannina, Greece, May 15, 2014, pp. 1-14.

* cited by examiner

METHOD FOR PREDICTING A LEVEL OF QOE OF AN APPLICATION INTENDED TO BE RUN ON A WIRELESS USER EQUIPMENT

REFERENCE TO RELATED EUROPEAN APPLICATION

This application claims priority from European Patent No. 16305390.3, entitled "METHOD FOR PREDICTING A LEVEL OF QOE OF AN APPLICATION INTENDED TO BE RUN ON A WIRELESS USER EQUIPMENT," filed on Apr. 1, 2016, the contents of which are hereby incorporated by reference in its entirety.

TECHNICAL FIELD

The invention relates to the field of wireless nodes and respective devices communicating with each other via a wireless communication.

BACKGROUND

Access gateways are widely used to connect devices at the home to the Internet or any other wide area network (WAN). Access gateways use in particular Digital Subscriber Line (DSL) technology that enables a high data rate transmission over copper lines or optical lines. Residential gateways, but also other devices such as routers, switches, telephones and set-top boxes, are understood in this context as Customer Premises Equipment (CPE) devices.

Access gateways including wireless technology have a key role in today's home and professional environments. A mechanism for connecting wireless devices to a Local Area Network (LAN) is called Wi-Fi, which is a brand name of the Wi-Fi Alliance for devices using the IEEE 802.11 family of standards for wireless data transmission. The IEEE 802.11 standards define two types of wireless nodes, a general wireless device that can connect to other devices called a station (denoted as STA) and a special type of a STA that is in control of the network, namely an Access Point (denoted AP). A Wi-Fi network, often called a WLAN (Wireless Local Area Network), consists of an AP with one or several STA connected to the AP.

Due to its flexible and "invisible" nature, a lot of LAN equipments are utilizing Wi-Fi rather than the classical wired Ethernet approach. This widespread usage of wireless LAN has exposed however a serious downside using a shared medium technology: interference. Interference, both Wi-Fi and non-Wi-Fi related, leads to a degraded user experience due to the nature of IEEE 802.11. In its most common form, IEEE 802.11 networks apply a medium access method in which collisions are avoided by sensing that the medium is used (denoted as CSMA-CA for Carrier Sense Multiple Access-Collision Avoidance). This uses a technique referred to as "Clear Channel Assessment" (CCA). Clear channel assessment determines whether a wireless communication channel is "occupied", e.g., "busy" with another wireless communication and/or has an amount of interference that makes the wireless communication channel unsuitable for communication. In this way, it is determined whether the wireless communication channel is available or not available for communication, e.g. occupied or not occupied. The medium access method is also commonly known as "listen before talk", describing the essence of the method. Interference from any nature can hence block the medium and force all nodes to remain silent for a certain amount of time.

Another impact of interference can be packet loss at the receiver side, leading to a reduction of the physical data rate. In this case, the interference is not detected by the CCA of the transmitter, but is decreasing the SINR (Signal to Noise and Interference Ratio) of the Wi-Fi packets as seen by the receiver.

Therefore, in certain circumstances, the Wi-Fi connection can suffer from poor performance and even connection loss. Some of these circumstances are obvious and easy to explain to an end user. For example, if the distance between the station and the access point is too large, then signal levels are low and performance will degrade. Other circumstances are "invisible" and not understood by the end user, e.g. a hidden node. A hidden node is invisible to some of the nodes of a network, leading to a practical failure of the CSMA-CA method, which can cause packet collision/corruption over air. In many cases, the end user is not able to diagnose the problem source and correct the issue.

With the recent development of tablets, laptops and smartphones there is an increase in the use of Wi-Fi. As a consequence, in-home Wi-Fi network connectivity becomes one of the main Internet service provider support costs and causes for help-desk calls. Indeed, as Wi-Fi connections are vulnerable to performance problems due to the shared medium, an end user may observe a decrease in Quality of Experience (QoE) of the applications he/she is currently running on one of his/her wireless equipments, such as an increase in the loading time of a website. The end user may mistakenly assume there is an issue with the service offered by the Internet Service Providers (ISP).

Internet service providers are therefore searching for ways to get a better understanding of the end user's wireless environment including link quality and performance and its impact on the QoE of the end user.

The present invention has been devised with the foregoing in mind.

SUMMARY OF INVENTION

According to a first aspect of the invention there is provided a computer implemented method for predicting a level of Quality of Experience (QoE) of an application intended to be run on a user equipment, said method comprising:
  computing said level of QoE of said application using a set of parameters representative of transmission conditions of a wireless link established between said user equipment and an access point, said set of parameters representative of transmission conditions of the wireless link being collected by said access point being prior the transmission of data between said user equipment and said access point.

Such a method enables to accurately predict an expected Quality of Experience (QoE) for an application intended to be run on a user equipment, such as a smartphone, connected to the Internet through a wireless link established between said user equipment and an access point, such as a residential gateway, said wireless link being for example a Wi-Fi link. Thus, such a method enables to determine those cases where the end user expectations in terms of QoE are not met because of the conditions of the wireless link.

This is made possible thanks to the knowledge of parameters representative of the transmission conditions of the wireless link—i.e. CCA statistics and transmission scheme chosen by the transmitter.

The method further comprises, prior to computing the level of QoE:
  measuring at least one parameter representative of the QoE of the application under different wireless transmission conditions, said different wireless transmission conditions being defined by different sets of parameters representative of transmission conditions of the wireless link, called learning sets,
  computing a mapping between the different learning sets and the parameter representative of the level of QoE of the application.

Prior to predicting the expected level of QoE of an application intended to be run on a user device, a learning phase is executed. During the learning phase, a parameter representative of the QoE of the application is measured several times under different wireless transmission conditions in order to establish a correlation between the parameters representative of a transmission conditions of the wireless link defining the different transmission conditions of the wireless link and the parameter representative of the QoE of the application. This is done, for example, by introducing attenuation on the transmission path between the access point and the user equipment or interferences due to different types of wireless communications, e.g. Wi-Fi or non Wi-Fi communications.

The method further comprises:
  determining the parameters of the learning sets which are significant influence on the level of QoE of said application.

Using all the parameters of the learning set does not improve the accuracy of the prediction of the level of QoE to be expected, it is thus useless to use all the parameters of the learning set.

According to another aspect of the method, the application intended to be run on the user equipment is a web-browsing application.

Web-browsing is responsible for a large fraction of the Internet traffic in local area networks and is consequently the application for which end users tend to be demanding in terms of QoE. It is therefore interesting to predict a level of QoE to be expected for web-browsing.

According to another aspect of the method, the parameter representative of the QoE of the application under different wireless transmission conditions is the page load time.

The page load time is considered one of the main indicators when it comes to web-browsing experience.

The method further comprises:
  computing a mapping between the page load time and a mean opinion score.

Mapping the page load time and the mean opinion score avoids costly user involvement.

According to another aspect of the method, the parameters representative of the transmission conditions of the wireless link of significant influence on the level of QoE of said application are an average physical layer transmission rate, a frame delivery ratio, and parameters representative of a business of a transmission medium of the wireless link due to interferences from wireless equipments located in a vicinity of the user equipment.

During the learning phase, it is determined that among all the parameters of the learning sets these four parameters are the more relevant for an accurate prediction of the level of QoE. The interferences from other wireless equipments are due to different types of wireless communications, e.g. Wi-Fi or non Wi-Fi communications.

According to another aspect of the method, the parameters representative of the transmission conditions of the wireless link are obtained by monitoring data transmission conditions through the wireless link during normal usage of the WLAN.

According to another aspect of the method, the parameters representative of the transmission conditions of the wireless link are collected by the access point.

Since the access point is the master node of every wireless local area network, it is the best location to monitor and collect data related to wireless transmission.

According to another aspect of the method, computing the level of QoE of said application is based on the mapping of the parameters representative of the transmission conditions of the wireless link of significant influence on the level of QoE and the mean opinion score.

The method relies on the use of the correlation established between the parameters representative of the transmission conditions of the wireless link of significant influence on the level of QoE and the mean opinion score during the learning phase.

According to another aspect of the method, computing the level of QoE of said application is based on the mapping of the parameters representative of the transmission conditions of the wireless link and the mean opinion score.

Another aspect of the invention is a circuit comprising a processor, a memory and a wireless node, the memory comprising instructions, which, when performed by the processor, perform a method according to an embodiment of the invention.

Another aspect of the invention is a gateway comprising a circuit comprising a processor, a memory and a wireless node, the memory comprising instructions, which, when performed by the processor, perform a method according to an embodiment of the invention. Some processes implemented by elements of the invention may be computer implemented. Accordingly, such elements may take the form of an entirely hardware embodiment, an entirely software embodiment (including firmware, resident software, microcode, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1:
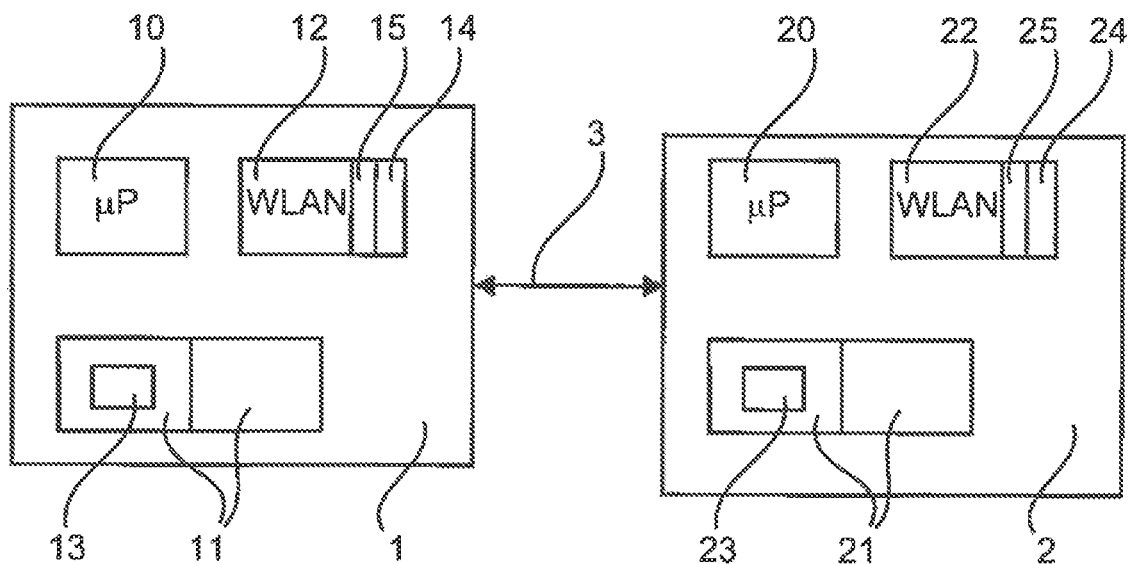
FIG. 1 represents an access point communicating with a station via a wireless communication.

It should be understood that the elements shown in FIG. 1 may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In the following description, example methods for predicting a level of QoE of an application intended to be run on a station or user equipment, are described, as well as a device performing the methods. For purposes of explanation, various specific details are set forth in order to provide a thorough understanding of preferred embodiments. It will be evident, however, to one skilled in the art that the present disclosure may be practiced without these specific details.

A CPE device includes, but is not limited to, for example a controller, e.g. a microprocessor, a memory, in which an operating system is stored for the operation of the CPE device, a wireless node for a wireless communication, and a circuit for a broadband connection, e.g. an xDSL connection. The wireless node includes, but is not limited to, a software driver, a physical layer with data buffers, and an antenna. A CPE device of this kind is for example an access gateway.

The wireless node is controlled by the software driver which executes a number of background tasks during operation of the wireless node, e.g. dynamic rate adaptation, packet aggregation, channel quality monitoring, and the like. On top of signal manipulations, the wireless driver also embeds an IEEE 802.11 protocol stack with the associated IEEE defined management and control messaging. The wireless driver will hence inject a number of management and control packets in the data stream, making it difficult to analyze a link by transparently looking at the data frame exchange only.

An arrangement illustrating a wireless communication is schematically depicted in FIG. 1: An access point 1 communicates with a station 2, or user equipment 2, via a wireless link 3. A station 2 may be for example a smartphone, a tablet, a laptop, etc. The access point 1 includes a circuit comprising a microprocessor 10, a memory 11, a wireless node 12 for the wireless link, and a monitor application 13. The station 2 includes a second circuit comprising a microprocessor 20, a memory 21, and a wireless node 22 for the wireless link. The wireless node 12 includes a physical layer 14 and a link layer 15, and the wireless node 22 includes a physical layer 24 and a link layer 25. The access point 1 is in particular a CPE device, for example a residential gateway establishing with the station 2 a home network of an end user. The monitor application 13 is included for analyzing and evaluating the wireless link 3 and retrieves in particular parameters representative of transmission conditions of the wireless link 3.

The monitor application 13 comprises instructions for the microprocessor 10 and the monitor application 23 comprises instructions for the microprocessor 20, which are included for diagnosing the wireless link 3 and which gather an information set about the wireless link 3. The information set includes in particular actual data rate, physical layer data rate, number of spatial streams, channel bandwidth, medium availability and Received Signal Strength Indicator (RSSI).

Monitor data are gathered in a passive mode, in which a data transmission is monitored between the access point 1 and the station 2 or vice versa.

Figure 2:
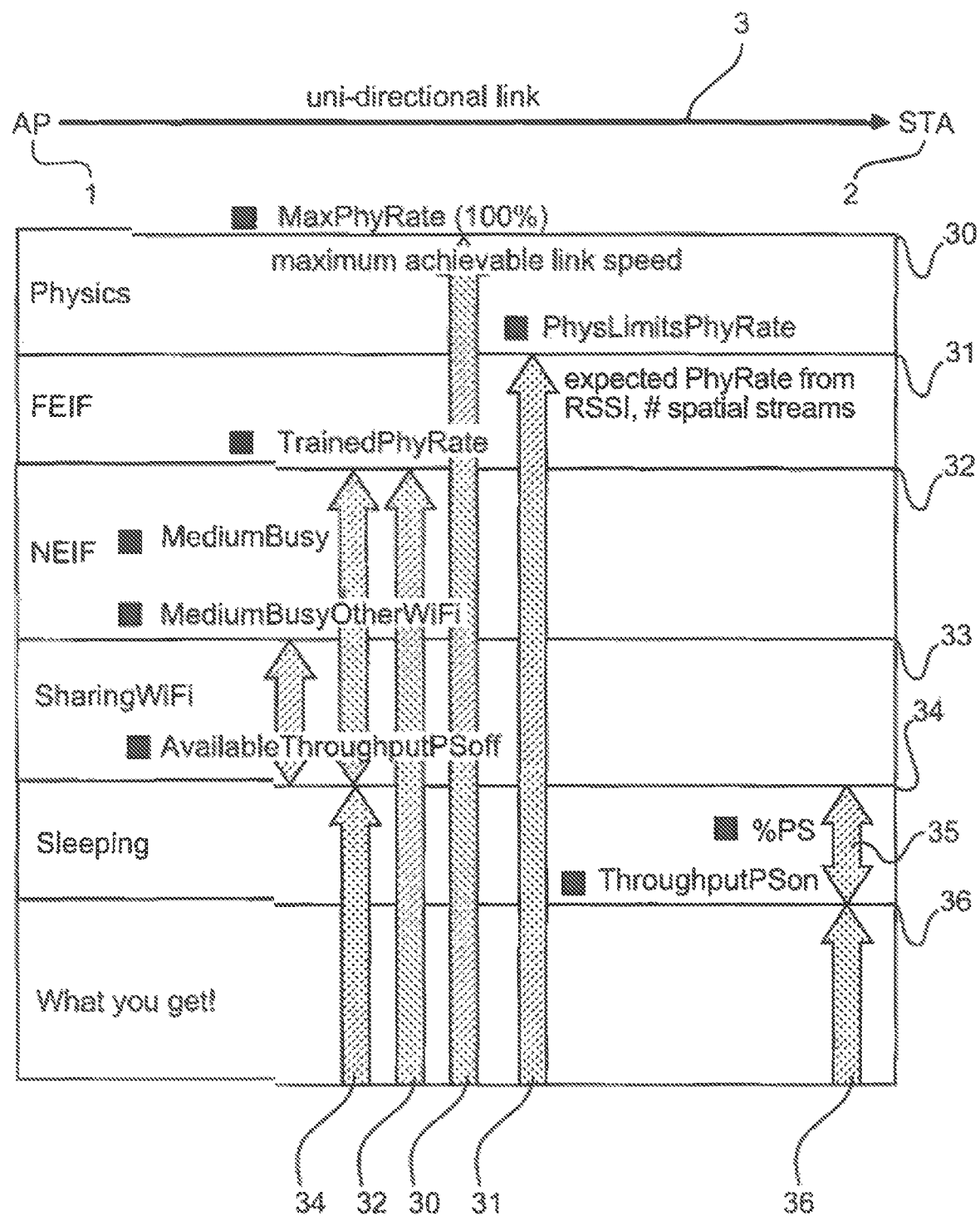
FIG. 2 represents data rates of a wireless communication according to FIG. 1.

FIG. 2 illustrates the possibilities which have to be considered when diagnosing the Wi-Fi performance between the access point 1 and the station 2. A unidirectional link 3' from the access point 1 to the station 2 is examined. The theoretical maximum data rate 30 for this link is given by the capabilities of the access point 1 and the station 2, called here MaxNegotiatedPhyRate or MaxPhyRate, which is for example 130 MB/s in case an IEEE 802.11n standard with 20 MHz channel bandwidth and two spatial streams is selected for the transmission between the access point 1 and the station 2. This is thus the maximum achievable link speed, 100%, which is only a theoretical value, because for most situations physical limitations come into play: the received signal strength RSSI at the station side is reduced for example due to the distance between the access point 1 and the station 2 and path loss due to any walls or other obstacles and reflections. Also the number of spatial streams has to be determined. The practically attainable data rate 31, called here PhysLimitsPhyRate, is therefore less than the data rate 30.

Further performance can be lost due to interference close to the station 2, which is not seen by the access point 1, called here far end interference FEIF: this can be any microwave source like RF Babyphone, microwave oven or a hidden Wi-Fi node, and leads to a further reduced data rate, called here TrainedPhyRate 32. Similar interference can appear at the access point 1, called here near end interference NEIF: This will reduce the available data rate 32 to a data rate 33, MediumBusyOtherWiFi. Further performance can be lost by sharing the medium with other Wi-Fi traffic, which can be caused by WLAN traffic in the home network, but also by Wi-Fi traffic of a neighboring network.

In order to monitor the data traffic of the physical layer, the layer 1 of the OSI (Open Systems Interconnection Model) model, transmission conditions of the traffic that is transmitted and received by the Wi-Fi node of the residential gateway, the residential gateway includes a monitor application receiving all received and transmitted packets. The monitor application has access to the following blocks:

Transmit (TX) packet queue, TX packets
Receive (RX) packet queue, RX packets
Transmit/Receive signal indicators (RSSI)

Although there are solutions describing a link between network transmission conditions, such as packet loss, latency and bandwidth and QoE, none of them teaches a link between parameters representative of the transmission conditions of a wireless link, such as a Wi-Fi link, Phy Rate; Wi-Fi medium business; etc., and QoE s.

Figure 3:
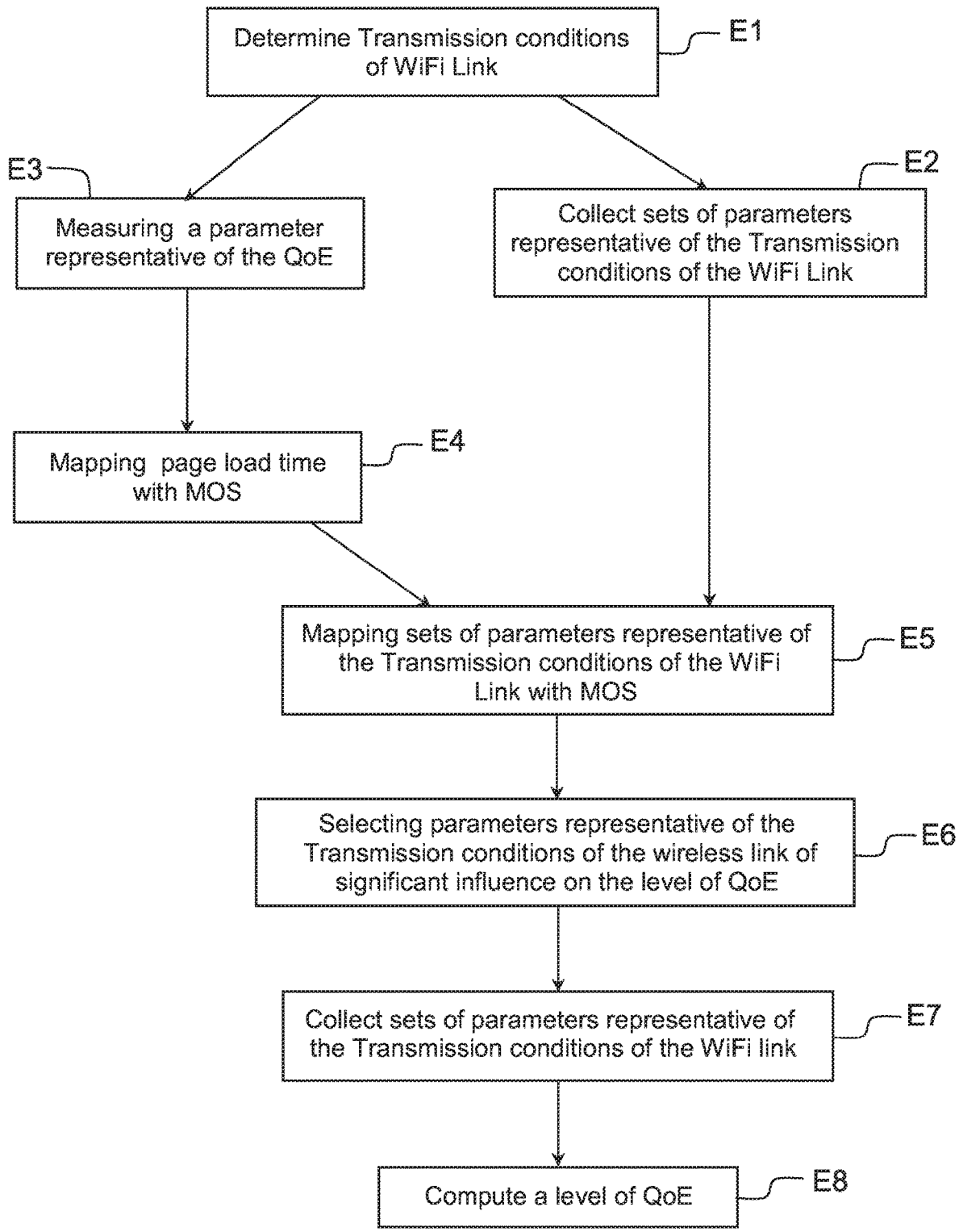
FIG. 3 represents a flow chart illustrating the steps of a method for predicting a level of QoE of an application intended to be run on a station according to one or more embodiments of the invention.

FIG. 3 represents a flow chart illustrating the steps of a method for predicting a level of QoE of an application intended to be run on a station according to one or more embodiments of the invention. An application is for example web-browsing, video streaming, voice over IP (VoIP), etc. The application is run on a station 2 or user equipment 2, such as a smartphone, or a computer connected to the Internet through a Wi-Fi link. In the following example, the considered application is web-browsing.

In order to determine the influence of Wi-Fi transmission conditions on the QoE for a given application, a plurality of transmission conditions of the Wi-Fi link are defined and for each of these transmission conditions, parameters representative of the transmission conditions are collected passively by the access point, during a leaning phase. These collected parameters are then processed by the monitor application 13, 23. In the meantime, i.e. during the learning phase, the station 2 performs a series of web-browsing tasks under the different transmission conditions of the Wi-Fi link and each time, a parameter representative of the QoE is measured.

Then a mapping is done between the parameters representative of the transmission conditions of the Wi-Fi link processed by the monitor application 13, 23 and the measured parameter representative of the QoE.

The learning phase comprises steps E1 to E6 of the method according to an embodiment of the invention.

This mapping is then used to predict a level of QoE of an application intended to be run on the station. In order to do so, the parameters representative of the transmission conditions of the Wi-Fi link are collected passively by the access point. Then using the mapping obtained during the learning phase, an expected level of QoE for the application is obtained.

Thus, during step E1 different transmission conditions of a Wi-Fi link are determined. In order to do so, the wireless transmission conditions are modified, for example, along axis: PhyRate and medium availability.

A variation in PhyRate is realised by introducing attenuation on the transmission path established between the access point and the station. For example, attenuations of 6, 12, 15, 18, 19 and 20 dBs are introduced, reducing the PhyRate.

The medium may be unavailable due to interferences from both Wi-Fi and no Wi-Fi communications. In order to emulate non Wi-Fi communications a narrowband sinewave signal is generated to block the access point CCA. In order to emulate Wi-Fi communications, a second pair access point/station generates competing Wi-Fi traffic which blocks the medium.

The different transmission conditions of the Wi-Fi link correspond to the different combinations of PhyRate and medium availability scenarios.

During a step E2, sets of parameters representative of the transmission conditions of the Wi-Fi are collected passively by the access point for each of the transmission conditions defined during step E1 by the monitor application 13, 23.

In the meantime, during a step E3, the station 2 performs a series of web-browsing tasks under the different transmission conditions of the Wi-Fi link determined during step E1, and each time, a parameter representative of the QoE is measured. In the case of web-browsing, such a parameter representative of the QoE is for example the page load time.

Thus during step E3, the station 2 accesses 10 times web pages such as google.com, twitter.com, amazon.fr, etc., and each time, the page load time is measured.

During a step E4, the page load time of a web page is mapped with a mean opinion score (MOS) defined in ITU-T recommendation G.1030. The MOS is an integer comprised between 1 and 5, 1 corresponding to the lowest QoE score and 5 corresponding to the highest QoE score. Thus the longer the page load time the lower the MOS. For example a MOS of 1 corresponds to a page load time of 10 seconds, since users usually lost focus after 10 seconds of waiting; and a MOS of 5 corresponds to the mean page load time per web page.

During a step E5, a mapping between the sets of parameters representative of the transmission conditions of the Wi-Fi link and the parameter representative of the level of QoE of the application measured for each web page access is computed.

For example a vector representing both the transmission conditions and the MOS is generated for each web page access. The RRSI and average Tx/Rx PHY rate strongly correlate with variations in the SNR of the Wi-Fi link since they indirectly measure the link quality. Information representative of the medium unavailability due to Wi-Fi and no Wi-Fi traffic is also reported. These vectors then feed a predictor such as the Support Vector Regressor (SVR).

The mapping obtained during step E5 enables to estimate an expected level of QoE considering only Wi-Fi effects.

In a step E6, a selection is performed to determine which parameters representative of the transmission conditions of the Wi-Fi from the set of parameters collected by the access point are the most relevant for predicting the level of QoE for a given application.

These selected parameters called parameters representative of the transmission conditions of the wireless link of significant influence on the level of QoE of the given application are obtained by feeding the predictor with different combinations of parameters representative of the transmission conditions of the wireless link and checking the accuracy of the predicted QoE with the MOS corresponding to the set of parameters representative of the transmission conditions of the wireless link from which the combinations of parameters representative of the transmission conditions of the wireless link are extracted.

For example, for web-browsing, the parameters representative of the transmission conditions of the wireless link of significant influence on the level of QoE are the average Tx PHY rate, the frame delivery ratio, MediumBusy, and MediumBusyOtherWi-Fi.

In a step E7, parameters representative of the transmission conditions of the Wi-Fi link are collected passively by the access point on a periodic basis.

In a step E8, a level of QoE is computed for a given application, e.g. web-browsing, by using the mapping obtained on step 5. The parameters used for computing the level of QoE are either the set of parameters representative of the transmission conditions of the Wi-Fi link collected by the access point, or depending on the application intended to be run on the station, parameters representative of the transmission conditions of the wireless link of significant influence on the level of QoE as selected during step E6.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method for predicting Quality of Experience (QoE) of an application running on a network device, the method comprising:
collecting a plurality of wireless parameters representative of wireless transmission conditions, wherein each wireless parameter of the plurality of wireless parameters is measured during a plurality of learning periods, wherein for each learning period wireless transmission conditions are modified by varying PhyRate and medium availability, wherein the plurality of wireless parameters is selected from the group comprising of physical layer data rate, number of spatial streams, channel bandwidth, medium availability, and Received Signal Strength Indicator, RSSI;
collecting one or more QoE parameters related to an application, wherein each QoE parameter of the one or more of QoE parameters is measured during the plurality of learning periods;
mapping the plurality of wireless parameters to the one or more QoE parameters; and
selecting, based on the mapping, one or more representative wireless parameters from the plurality of wireless parameters that most significantly influences the one or more QoE parameters in order to enable a device to predict a QoE level for the application for a wireless environment of a first time period by only measuring the one or more representative wireless parameters, wherein the selecting is performed by feeding a predictor with different combinations of the plurality of wireless parameters and checking an accuracy of the predicted QoE level with a Mean Opinion Score (MOS) for each combination of the different combinations.

2. The method of claim 1, wherein the one or more QoE parameters are measured at a network device.

3. The method of claim 2, wherein each of the plurality of wireless parameters is measured at an access point (AP).

4. The method of claim 3, wherein a QoE parameter of the one or more QoE parameters is a mean opinion score (MOS) based on a page load time of the application.

5. The method of claim 4, wherein the plurality of wireless parameters is selected from the group comprising of actual data rate, physical layer data rate, number of spatial streams, channel bandwidth, and Received Signal Strength Indicator (RSSI).

6. The method of claim 5, wherein the plurality of wireless parameters are collected by monitoring, at the AP, data transmissions between the AP and the network device.

7. The method of claim 6, wherein the application is a web browser.

8. The method of claim 7, wherein the first time period does not overlap with the set of learning periods.

9. The method of claim 8, wherein the AP is part of a customer premises equipment.

10. The method of claim 8, wherein the AP is a gateway.

11. The method of claim 8, wherein the network device is a station (STA).

12. An access point (AP) comprising:
a processor;
a wireless node operatively connected to the processor;
wherein the processor and wireless node are configured to:
collect a plurality of wireless parameters representative of wireless transmission conditions, wherein each wireless parameter of the plurality of wireless parameters is measured during a plurality of learning periods, wherein for each learning period wireless transmission conditions are modified by varying PhyRate and medium availability, wherein the plurality of wireless parameters is selected from the group comprising of physical layer data rate, number of spatial streams, channel bandwidth, medium availability, and Received Signal Strength Indicator, RSSI;
collect one or more QoE parameters related to an application, wherein each QoE parameter of the plurality of QoE parameters is measured during the plurality of learning periods;
map the plurality of wireless parameters to the one or more QoE parameters;

and select, based on the mapping, one or more representative wireless parameters from the plurality of wireless parameters that most significantly influences the one or more QoE parameters in order to enable a device to predict a QoE level for the application for a wireless environment of a first time period by only measuring the one or more representative wireless parameters, wherein the selecting is performed by feeding a predictor with different combinations of the plurality of wireless parameters and checking an accuracy of the predicted QoE level with a Mean Opinion Score (MOS) for each combination of the different combinations.

13. The AP of claim 12, wherein the one or more QoE parameters are measured at a network device, and wherein the network device is a station.

14. The AP of claim 13, wherein a QoE parameter of the one or more QoE parameters is a mean opinion score (MOS) based on a page load time of the application.

15. The AP of claim 14, wherein the plurality of wireless parameters is selected from the group comprising of actual data rate, physical layer data rate, number of spatial streams, channel bandwidth, and Received Signal Strength Indicator (RSSI).

16. The AP of claim 15, wherein the plurality of wireless parameters are collected by monitoring, at the AP, data transmissions between the AP and the network device.

17. The AP of claim 16, wherein the application is a web browser.

18. The AP of claim 17, wherein the first time period does not overlap with the set of learning periods.

19. The method of claim 1, wherein the medium availability is determined by performing a clear channel assessment as part of the collecting the plurality of wireless parameters.

20. The AP of claim 12, wherein the medium availability is determined by performing a clear channel assessment as part of the collecting the plurality of wireless parameters.

* * * * *